United States Patent [19]

Murray

[11] Patent Number: 4,680,207

[45] Date of Patent: Jul. 14, 1987

[54] THERMOPLASTIC SACK

[75] Inventor: Charles R. Murray, Toronto, Canada

[73] Assignee: C-I-L Inc., North York, Canada

[21] Appl. No.: 888,569

[22] Filed: Jul. 23, 1986

[51] Int. Cl.$^4$ .............................................. B32B 27/08
[52] U.S. Cl. ..................................... 428/35; 428/500;
428/516; 428/910; 428/349; 525/240
[58] Field of Search ................. 428/35, 516, 500, 910, 428/349; 525/240

[56] References Cited

U.S. PATENT DOCUMENTS

| | | | |
|---|---|---|---|
| 4,277,578 | 7/1981 | Yoshimura et al. | 525/211 |
| 4,357,191 | 11/1982 | Bullard et al. | 428/516 |
| 4,399,181 | 8/1983 | Yoshimura et al. | 428/910 |
| 4,444,828 | 4/1984 | Anthony et al. | 428/516 |
| 4,457,960 | 7/1984 | Newsome | 428/516 |
| 4,551,380 | 11/1985 | Schoenberg | 428/516 |
| 4,561,920 | 12/1985 | Foster | 428/516 |
| 4,576,844 | 3/1986 | Murray et al. | 428/349 |
| 4,629,574 | 12/1986 | Cancio et al. | 525/240 |

*Primary Examiner*—Edith Buffalow
*Attorney, Agent, or Firm*—C. Brian Barlow

[57] ABSTRACT

A cold-drawn unbalanced biaxially oriented linear low density polyethylene film having a transverse direction draw ratio selected from greater than 1 to less than 3 and a machine direction draw ratio of less than 6 but greater than the transverse direction draw ratio. The film has enhanced tensile and puncture resistance while maintaining acceptable tear properties and is used for shipping sacks.

13 Claims, 8 Drawing Figures

THERMOPLASTIC SACK

This invention relates to unbalanced biaxially oriented linear low density polyethylene films and, more particularly, to both tubular and heavy duty shipping sacks formed therefrom.

Thermoplastic sacks are used in the packaging, transportation or storage of a great variety of materials ranging from powders and granules, bulky and lightweight materials, and agricultural materials such as hay and silage. The thermoplastic sacks according to this invention have general applicability to such products.

Bulky but lightweight materials such as fiberglass insulation and peat moss are generally shipped in compressed form in thermoplastic sacks. These sacks are generally known as tubular insulation sacks or bags and take the form of an extended envelope or tube sealed at one end prior to its being filled with product. For the most part these sacks are produced by the commonly known in the art "blown film" process, which owes its popularity to the fact that it can be quickly and readily adapted to the production of different widths and thicknesses of continuous tubes which can then be easily cut to length and sealed at one end to produce an open top sack.

It will be readily appreciated that the thinner the film thickness (gauge), commensurate with acceptable film properties, the less the amount of thermoplastic material required. This downgauging of sack wall thickness is a most desirable industrial goal. Walls of sacks produced as tubes by the blown film process, typically, have a film thickness in the range of 3-6 mil ($75-150 \times 10^{-4}$ cm) which is generally determined by the machine direction (MD) tensile strength necessary to handle the package weight, the film stretch resistance required to prevent expansion of the compressed product and the puncture resistance of the bag for distribution handling. The tubes from which these sacks are commonly made are produced with a bubble diameter/die diameter generally of 3:1 in order to optimize film strength properties.

Although various attempts have been made to use high density polyethylene for the manufacture of downgauged bags because of its high stretch resistance and tensile strength these have largely been abandoned because of poor tear resistance and impact puncture properties. In view of this, polyethylene insulation sacks are most commonly made from resins which have superior tear resistance and impact puncture properties such as low density or linear low density polyethylene.

It is well known in the art to produce polyethylene films having enhanced puncture, tensile strength and stretch resistance by the process of uniaxially cold-drawing the film below its melting point. However, because of the unbalanced physical properties e.g. poor MD tear strengths, of these oriented films, which causes "splittiness", they have been ignored for use in tubular shipping sacks.

In my copending U.S. application Ser. No. 797,918, filed November 14, 1985, I have described an improved shipping sack formed of a uniaxially oriented polyethylene film having good machine direction tear resistance. The uniaxially oriented film is produced by blowing and cold-drawing the polyethylene film at a draw ratio to blow ratio (DR/BR) of greater than 1:1.

In the process described in Ser. No. 797,918, the film is blown at a temperature greater than the crystalline melting point (Tc) of the polyethylene resin prior to the cold-drawing of the resultant film, in the machine direction only, at a temperature lower than Tc. The effect of this is to produce orientation, in essence, in only one direction, namely the machine direction to produce uniaxially oriented film. It is understood in the art that film orientation refers to the film drawing which occurs below the Tc and not to the normal film drawing which occurs in the blown film process above Tc.

Biaxial orientation of thermoplastic films is a well known technique wherein a blown or cast film is uniformly cold-drawn in the machine and transverse direction at a temperature greater that the glass transition temperature (Tg) but less than Tc.

Typically, biaxially oriented films are cold-drawn uniformly in both directions to produce an increase in surface area of about 40 times the undrawn film area, with a consequent reduction in film thickness, i.e. from 40 mil to 1 mil. This orientation has very beneficial effects in improving the tensile and impact properties of the film, typically, by a factor of 5 times that of the undrawn film. However, this improvement in tensile and impact properties is gained by a corresponding loss in the tear properties of the film which is typically reduced to only 10% of the undrawn film in both machine and transverse directions.

While the improved tensile and impact properties of a typical biaxially oriented film would be very valuable in increasing the functional strength of a plastic shipping sack the extremely poor tear properties of the film make it unacceptable for shipping sack use. Plastics shipping sacks generally now have punched holes or perforation to allow for the evacuation of air from the bag after filling. These perforations become the focus for zipper tears in biaxially oriented film when impacted under normal handling conditions used for industrial shipping sacks.

Surprisingly, I have now found that by producing an unbalanced draw biaxially oriented film having specific characteristics a greatly improved film for use in shipping sacks can be made. I have found that by restricting the degree of transverse direction (TD) draw in the film relative to the machine direction (MD) draw the dramatic imbalance of tensile and tear properties associated with uniaxially orientation and associated tendency for film "splittiness" can be avoided.

Accordingly, the invention provides a thermoplastic shipping sack having walls comprising a cold-drawn unbalanced biaxially oriented linear low density polyethylene film having a transverse direction draw ratio selected from greater than 1 to less than 3 and a machine direction draw ratio of less than 6 but greater than the transverse direction draw ratio.

Preferably, the unbalanced biaxially oriented film has a cold-drawn transverse direction ratio of about 2 and a cold-drawn machine direction ratio of about 5. This results in a ratio of machine direction draw ratio to transverse direction draw ratio of 2.5.

By the term "draw ratio" is meant the ratio of the length of drawn film to the length of undrawn film.

It is an essential feature of the invention that the film is drawn to a greater degree in the machine direction than the transverse direction.

I have thus found that a shipping sack having improved film stretch resistance and high tensile strength in both MD & TD directions in addition to acceptable tear resistance comparable to that for non-oriented film and in contrast to the usually reduced TD stretch and tensile strength resistance for uniaxially oriented polyethylene film can be manufactured.

The linear low density polyethylene may, optionally also contain a minor amount of high density polyethylene when extra heat resistance is required of the sack.

I have further found that by blending in a minor amount of high pressure process (i.e. non-linear) low density polyethylene resin with the linear low density polyethylene resin an unbalanced biaxially oriented film having further enhanced tear properties can be produced.

Accordingly, in a more preferred feature the invention further provides a thermoplastic sack as hereinbefore defined wherein said linear low density polyethylene contains a minor amount of low density polyethylene.

The amount of low density, polyethylene present in the polyethylene blend prior to drawing into film can be readily determined by the skilled man to be that amount which provides acceptable enhanced tear properties. Typically, the blends may comprise up to 30% high density or low density polyethylene, and preferably comprises 20% low density polyethylene. This offers unbalanced biaxially oriented film for use in shipping sacks according to the invention which could be down-gauged by 30%.

The cold-drawn film process providing the film according to the invention basically comprises the steps of extruding molten thermoplastic resin through a circular die and drawing the tubular melt over a chilled mandrel and subsequently a tapered mandrel by means of a set of nip/draw rolls. The action of the speed of the nip/draw rolls on the film affects orientation in the machine direction while expansion of the film tube diameter over the tapered mandrel effects orientation in the transverse direction, to produce a biaxially oriented film. Adjustment of the pull of the nip/draw rolls alters the degree of machine direction orientation relative to the transverse direction orientation. A vacuum brake installed between the first and second mandrel is used to separate the high tension requirements of the cold drawing process from the low tension requiremenets of the hot blown film process.

The heat seal produced in the tube, i.e., the two flattened sides (films) of the tube, by the end seal head in the process hereinabove described is produced under a combination of pressure and heat, at or above the films'- crystalline melting point, applied to the films in order that they are truly welded at their interfaces such that a clean separation cannot be effected by physical or chemical means. It is known that heat build-up during the sealing operation may be sufficient to destroy the orientation of uniaxially oriented films in the vicinity of the heat seal and thus cause serious loss of draw-induced impact strength. I have found that sacks manufactured by the process hereinbefore described have sufficient impact strength suitable for the intended light duty purpose for which the sacks are made.

It has thus been found that a suitable open-top tubular polyethylene shipping sack having improved puncture resistance and (TD) and (MD) tensile strengths, while still retaining acceptable tear and edgefold impact strength, can be manufactured using suitably modified conventional film process apparatus.

By the term "tubular shipping sacks" is meant sacks having a resultant shape generally of a tube, optionally provided with gussets, whether made by the specific process as hereinbefore described or by alternative processes known in the art which may or may not involve the "back-sealing" of an oriented film.

In addition, tubular shipping sacks of alternative structure to the simple open-top sack described hereinabove and utilizing the feature of the invention to provide the promised advantages may be produced. Such an alternative tubular sack is the type known as a "valved bag" shipping sack, which is closed at both ends of the tube and has a self-closing valve structure at an upper side or end.

Such alternative bags may be made by conventional processes well known in the art suitably modified to provide a sack formed of unbalanced biaxially oriented linear polyethylene film produced by cold-drawing at the aforesaid TD and MD draw ratios.

Also included within the scope of the invention are those shipping sacks incorporating the feature of the invention wherein the seals or other closures provided in the sacks are formed by adhesive bonding as an alternative to heat sealing. Use of such adhesive bonding provides the advantages promised hereinabove and also improved impact resistance to the sack. This preferably permits use of such sacks for the packaging of heavy materials such as, for example, fertilizers and chemicals.

Accordingly, the invention provides a thermoplastic sack having a front wall and a back wall, each of said front wall and said back wall comprising a ply of said unbalanced biaxially oriented linear polyethylene, said ply being produced by cold-drawing said linear polyethylene at a TD and MD draw ratio as hereinbefore defined.

While the foregoing disclosure has made particular reference to thermoplastic sacks in the form of tubular sacks suitable for use with lightweight and bulky materials, I have found that the aforesaid sacks can be suitably modified to provide an improved heavy duty thermoplastic shipping sack. Such sacks may be used for the transportation, packaging and storage of a wide variety of products in granular or powder form. These sacks may also be of the open-top type, requiring separate provision for closing, or fitted with a valved opening.

Disclosed in our U.S. Pat. No. 4,576,844 issued March 18, 1986, are heavy duty shipping sacks comprised of a double layer of non-cold-drawn low density polyethylene interposed between two plies of cross-laminated uniaxially oriented linear polyethylene film.

However, I have now found that a much cheaper thermoplastic shipping bag than the aforesaid cross-laminated structured bag can be manufactured having both excellent heat sealability and puncture resistant properties.

I have surprisingly found that two layers of low density polyethylene can be welded to each other between and to two unbalanced biaxially oriented linear polyethylene films or plies constituting the walls of a shipping bag without there being sufficient heat build-up to cause serious loss of cold-draw induced film strength. Thus, an acceptable bridge between a high strength unbalanced biaxially oriented film and the body of the heat seal is formed. This is to be contrasted with the fact that although two uniaxially oriented films in the absence of interposed low density polyethylene film could be melted and fused together to produce welded bonds, the uniaxially oriented film immediately adjacent to the welded mass has its cold-draw orientation reduced by the heat from the seal with consequent reduction of film strength in this margin area; whereby the seals so produced are sufficiently weak and brittle in the margin area, so as to render them unacceptable for use in heavy duty shipping bags.

It has thus now been found that a suitable thermoplastic shipping bag having improved puncture and snag resistance can now be reliably manufactured by heat sealing techniques using suitably modified conventional equipment.

Thus, in a further aspect the invention provides a thermoplastic shipping bag having a front wall and a back wall, each of said front wall and said back wall comprising a ply of unbalanced biaxially oriented linear polyethylene produced by cold-drawing said linear polyethylene as hereinbefore defined; and wherein interposed between said plies are two inner layers of non-cold-drawn low density polyethylene.

Each of the interposed layers of low density polyethylene may constitute simply a sheet of polyethylene laminated to a surface of an unbalanced biaxially oriented ply and being of sufficient thickness in the heat seal area to effect an acceptable bridge between the two unbalanced biaxially oriented plies in this area to form a seal. However, each of these interposed layers of low density polyethylene may extend beyond the heat seal area to represent a laminated layer on the respective full surface of each of the unbalanced biaxially oriented plies. Thus, each of the unbalanced biaxially oriented plies comprising the walls of the shipping bag have a layer of low density polyethylene laminated thereto. Such a structure, of course, does not detract from the requirement that the unbalanced biaxially oriented plies need only be heat sealed at designated heat seal areas. These areas constitute those parts of the bag, generally parts of the periphery, where the front and back walls are joined by heat sealing during manufacture.

Where the layers of low density polyethylene are represented as laminated sheets on the unbalanced biaxially oriented plies, each of the sheets must be of sufficient thickness to effect an acceptable bridge between the two unbalanced biaxially oriented plies. I have found that a mere coating of low density polyethylene on each of the unbalanced biaxially plies is not sufficient, and that a minimum thickness of 0.5 mil of low density polyethylene is required, preferably >1.5 mil.

I have also found that both of the unbalanced biaxially oriented plies constituting the walls of the sack must have a laminated sheet of low density polyethylene to provide an acceptable heat seal for heavy duty bag use. A single interposed layer of low density polyethylene, represented either as a laminated sheet or as a distinct ply, is not satisfactory. Thus, a double layer of polyethylene is required.

In a much preferred form of a sack according to the invention the interposed layers of low density polyethylene represent full and distinct plies constituting part of the walls of the sack.

Accordingly, the invention further provides a sack as hereinbefore described wherein each of said layers of low density polyethylene constitutes an inner ply of the bag.

In this preferred form of sack each of the walls comprising an unbalanced biaxially oriented ply has an interposing ply of low density polyethylene associated therewith. In this arrangement, each of the interposing plies may be considered as being an inner wall of the sack while the two unbalanced biaxially oriented plies are considered as being the two outer walls.

The terms "inner wall" and "inner ply" are meant not to be restricted solely to the actual or true inner wall or ply of the sack which contacts product when the sack is filled. The terms also include the situation, for example, where one or more plies of non-oriented low density polyethylene constitute plies in a multi-wall sack which plies may or may not be adjacent the true inner wall or ply. Similarly, the terms "outer wall" or "outer ply" are meant not to be restricted solely to the most external wall or ply.

Thus, it should be understood that the principles of the invention are applicable also to the fabrication of sacks having walls individually comprising more than two plies. Thus, the invention embraces sacks having three plies, four plies, etc. The important feature for a heavy duty sack is that there must be either a laminated layer of or at least one ply of non-oriented low density polyethylene constituting each of the inner surfaces or inner walls of the sack such that an unbalanced biaxially oriented ply of linear polyethylene does not contact another unbalanced biaxially oriented ply of linear polyethylene at a designated heat seal area of an inner surface such as to weaken a heat seal when heat seal strength is a desired feature.

In preferred embodiments of the heavy duty sacks according to the invention as hereinbefore and hereinafter defined the interposed layer of low density polyethylene represented either as a laminated sheet on the unbalanced biaxially oriented ply or as a distinct inner ply or inner wall, is formed of blown linear low density polyethylene. However, it is readily apparent that cast films are also suitable for this application.

A two-ply sack is the simplest embodiment of this heavy duty sack. However, in some instances, it is advantageous to have more than two inner plies of non-oriented film constituting the inner layers of the sack, i.e., between the front and back unbalanced biaxially oriented outer sides of the sack. An example of this would be a sack of the simplest embodiment with an additional thin true inner ply of linear low density polyethylene in the form of a fine filter mesh to allow air to be filtered from powdered products, as described in our copending U.S. application Ser. No. 632,522, filed July 19, 1984.

In other instances it may be preferred to have additional plies of film outermost of the unbalanced biaxially oriented ply. Such an outer ply could give the benefit resulting from introducing blown low density polyethylene film between the gussetted surfaces of unbalanced biaxially oriented plies to give the same improvements in seal quality as created on the innermost parts of the bag. The squared-off appearance of the final package resulting from this gussetting improves its performance for palletizing and stacking.

An additional benefit to be gained from such an outer layer is that the surface can be suitably roughened by the addition of ultra high molecular weight HDPE granules to the film during film extrusion; thus, imparting additional improved handling properties to the sack. As well, the inner surface of this outer ply can be printed and the resulting message thus locked between plies to escape abrasion and distortion during the handling of filled packages. It can easily be seen that the utility of this outer ply can be expanded by using a laminate or coextrusion film to impart special properties to the bag, i.e., oil barrier or grease resistant layers.

The utility thus lies in the fact that by the introduction of a double layer of a non-cold-drawn low density polyethylene film between the mating surfaces of two unbalanced biaxially oriented polyethylene films both open top and valved top type heavy duty shipping sacks, suitable for the packaging of expensive or hazardous materials, can be reliably manufactured using commonly available heat seal sack making equipment.

The open-top shipping sack for heavy duty use may be made by feeding a web of the unbalanced biaxially oriented film in conjunction with an inner web of blown low density polyethylene through commercial side-weld, heat sealed or back seamed and bottom heat sealed bag making equipment.

One particularly useful type of a thermoplastic shipping sack is that known as a valved bag. One such embodiment is described in our U.S. Pat. No. 3,833,166. These bags possess the important commercial advantage of being easily filled through a valve structure with the self-closing of this valve structure after filling. The heavy duty sacks according to the invention are of particular value in the form of a valved bag.

The term "low density polyethylene" includes low density ethylene homopolymers and copolymers, such as the linear low density polyethylenes, vinyl acetate copolymers, and blends thereof.

The term "linear low density polyethylene" as used within this specification and claims includes linear low density ethylene copolymers with the lower olefins such as, for example, butene, n-hexene, 4-methyl 1-pentene and octene.

While it is generally accepted that all polyethylene film is generally oriented to some degree, the term "unbalanced biaxially oriented" when used with reference to linear polyethylene in this specification and claims means polyethylene film that has been cold-drawn in the transverse direction to at least greater than a 1:1 fold extent, preferably to a 2-fold extent, but also up to a 3-fold extent; and in the machine direction to a greater degree than in the transverse direction to a value not greater than 6:1. The orienting of the films may be carried out by the cold-drawing of the tube as hereinbefoare described.

The cold-drawn unbalanced biaxially oriented film of use in the invention made from linear low density polyethylene resins and low density polyethylene blends thereof can be used in a variety of thicknesses. One particular blend of use in the practice of the invention comprises linear low density and low density polyethylenes in the ratio of 4:1.

Also included within the scope of the invention are single ply tubular shipping sacks having walls formed of a co-extruded laminate comprising a layer of unbalanced biaxially oriented linear polyethylene produced as hereinbefore defined and a layer of a low density ethylene polymer or copolymer compatible with said unbalanced biaxially oriented linear polyethylene. Examples of such compatible copolymers of use in the invention are ethylenevinyl acetate copolymers, ethylene-ethyl acrylate copolymers and ethylene-methyl methacrylate copolymers.

It is well known in the art to co-extrude such a two or more polymer system to form a laminate by means of conventional co-extrusion equipment. However, in the process according to the invention as is applicable to a laminate the compatible ethylene polymer or copolymer is also subjected to the novel same MD/TD draw ratios subsequent to the co-extrusion step as is the unbalanced biaxially oriented linear polyethylene.

The compatible ethylene polymer or copolymer layer of the laminate may constitute either the inner surface or the outer surface of the sack to provide additional utility to the sack. For example, where the compatible polymer or copolymer of the laminate is a soft-flexible copolymer, such as 10% ethylene-vinyl acetate, providing an external surface of the sack it provides superior anti-slip properties. Where a 20% ethylene-methyl acrylate copolymer of the laminate provides the inner layer of the sack, the sack may generally be heat sealed at temperatures as low as 80 degrees C. which reduces the risk and degree of disorientation of the vulnerable oriented layer.

The co-extruded laminate may comprise two or more compatible layers as is deemed appropriate.

Also embraced within the scope of this invention are sacks formed of films comprising a laminate formed by adhesive lamination of suitable films.

Multi-laminated plies may be used wherein one laminate layer constitutes a barrier layer to the movement of chemical vapour through the sack walls.

Accordingly, the invention provides an open-top tubular shipping sack as hereinbefore defined wherein said film or ply of unbalanced biaxially oriented linear low density polyethylene forms part of a multi-layer laminate with one or more layers of one or more compatible ethylene polymers or copolymers.

In a further aspect, the invention provides a thermoplastic film suitable for use for a shipping sack, said film formed of unbalanced biaxially oriented linear low density polyethylene prepared by the cold-drawing of said polyethylene at machine and transverse draw ratios as hereinbefore defined.

In yet a further aspect, the invention provides a thermoplastic film as hereinabove defined and wherein said film forms part of a multi-layer laminate with one or more layers of one or more compatible ethylene polymers or copolymers. The layer of the compatible ethylene polymer is at least 0.5 mil thick and, preferably, at least 1.5 mil thick.

Preferably, the compatible ethylene polymer is low density polyethylene.

Several embodiments of this invention will now be more particularly described by way of example only with reference to the accompanying drawings, in which.

Figure 1:
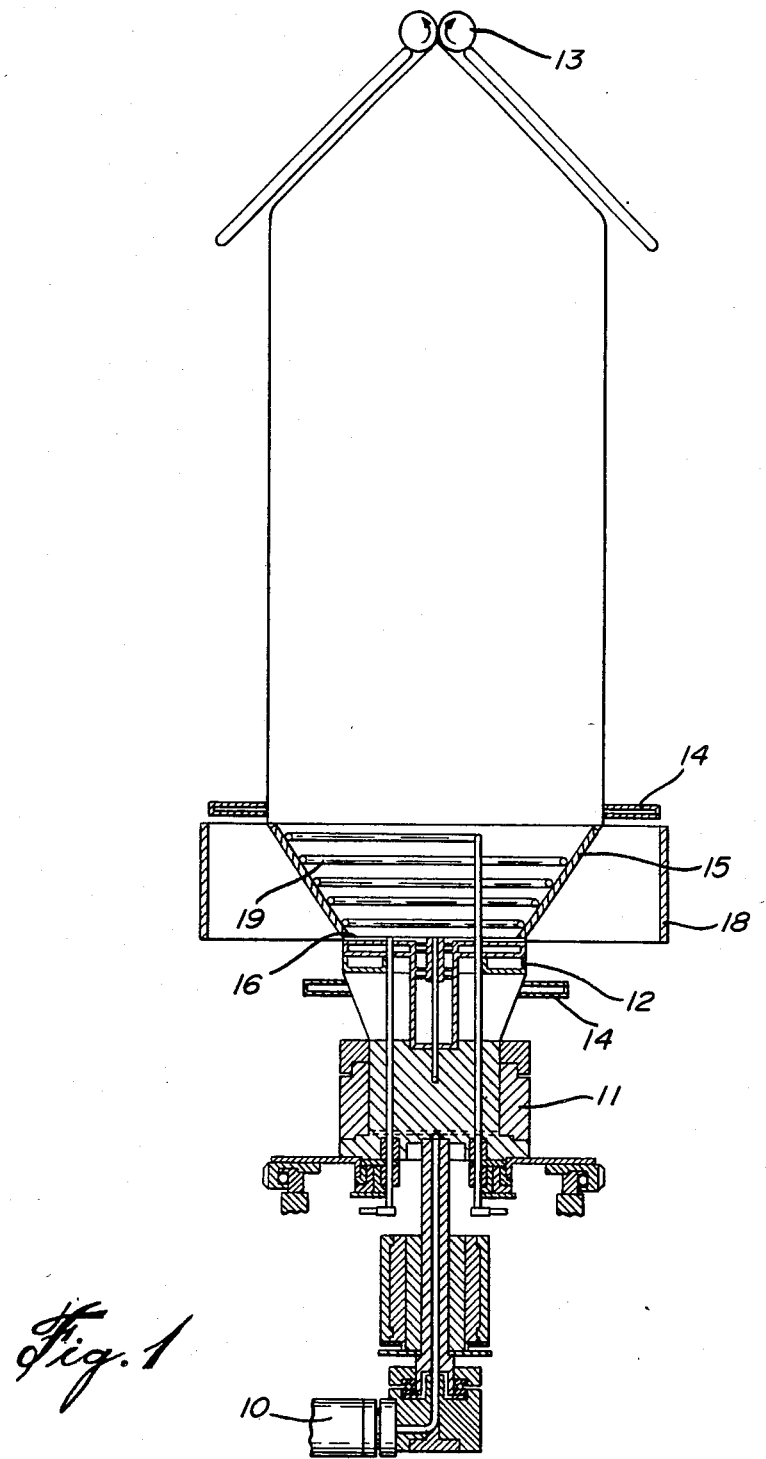
FIG. 1 shows a schematic diagram of the apparatus used in the manufacture of the film according to the invention.

With reference to FIG. 1, molten thermoplastic resin is extruded from an extruder 10 having an 8" annular die 11 having a 0.05" diameter gap. The film thickness as it leaves the die is approximately 0.075" and the tubular film melt is at a temperature of 220 degrees C. Adjacent the die 11 is a uniformly cylindrical lower mandrel 12 over and along the surface of which lower mandrel is pulled the tubular film by means of at least one pair of nip/draw rolls 13. The lower mandrel is maintained at a temperature ca. 85 degrees ca. to effect chilling of the film melt. The film in the region immediately prior to lower mandrel 12 is at a temperature above its crystalline melting point, i.e. ca. 121 degrees C. and, thus, no cold-drawing occurs in this region. Acting on the film in this region is a cooling air stream directed from an air ring 14, which cools the film to a temperature of between 135 degrees C.-150 degrees C. As the film moves from the die lips to the part where it is frozen on the lower mandrel 12 it is drawn down to 0.025" by means of nip/draw rolls 13.

Adjacent the upper end of lower mandrel 12 is a tapered mandrel 15 separated from lower mandrel 12 by a vacuum slot 16. As the film passes to and over tapered mandrel 15 a controlled vacuum is applied to the film through vacuum slot 16. This allows the generation of a higher tension from nip/draw rolls 13 to draw and thin the film over tapered mandrel 15 to the required thickness of 2.5 mil. i.e. the film tension on lower mandrel 12 is thus substantially lower than that generated on tapered mandrel 15. As the 0.025" thick tubular film passes vacuum slot 16 the vacuum pressure is adjusted to produce sufficient draw tension on the film draw nips 13 to pull the film over tapered mandrel 15 and cold-draw it in the transverse direction, and, at the same time, in the machine direction to a tubular diameter of 17.4". The film temperature is advisably rapidly reduced to ca. 60 degrees C. i.e. below its softening point, prior to entry between the nip/draw rolls 13 by means of air ring cooling 17 adjacent tapered mandrel 15. Adjacent mandrel 15 is a metallic reflective shield 18 which minimizes the reflective heat lost from the rapidly thinning film on tapered mandrel 15.

The speed of nip/draw rolls 13 is controlled to effect drawing of the film to the desired gauge. After exiting nip/draw rolls 13 the flattened film tube of 26" width is, optionally, passed to a corona discharge unit to burn the film surface to make it receptive to ink application when next passed through a flexographic stack press. The tube is then reinflated by passing it through two sets of nip rolls (not shown) with an air bubble trapped between them while the edge of the tube is tucked by forming plates just prior to the second set of nips in order to form any required gusset in the tube. The tube finally passes to an end seal head where it is heat sealed and guillotined to provide a 66" x 16" x 10" insulation sack.

The above film has, thus, been drawn to a transverse direction draw ratio of 2.2 and a machine direction draw ratio of 4.5.

EXAMPLE I

A series of experiments were carried out to evaluate the effect of uniaxial orientation on a linear low density polyethylene film. In these experiments a polyethylene blend consisting of linear low density polyethylene (4 parts, density 0.918, melt index 0.5-ESCORENE 1030* from ESSO CHEMICAL) and low density polyethylene (1 part, density 0.923, melt index 0.3-CIL 503 *-1% silica) were blown and cold-drawn on modified conventional equipment as described in copending U.S. application Ser. No. 797,918 filed November 14, 1985. The films were blown from the resin at different blow ratios and subsequently cold-drawn below their crystalline melting point at different draw ratios and tested for MD and TD tear resistance. The process parameters and results are given in Table 1. The results show the unfavourable TD tensile strength obtained for these films.

EXAMPLE II

A series of experiments were carried out to evaluate the effect of balanced biaxial orientation on a linear low density film. In these experiments blown film samples of a 12 mil film produced at a 1:1 blow ratio from a resin formulation of an 80/20 blend of EXXON 1030 /CTL 633 * were stretched at a temperature of 105 degrees C. on a T. M. Long Co. film stretcher following results. EXXON 1030 is a linear low density polyethylene-butene copolymer having a melt index of 0.5 g/10 mins and density of 0.922 g/cc. CIL 633 is a 2% vinyl acetate - low density polyethylene copolymer having a melt index of 0.3 and density of 0.925 g/cc. The films were cold-drawn equally in the MD and TD below the crystalline melting point to form balanced biaxially oriented films. The results are shown in Table 2.

TABLE 1

| No. | Resin (ESCORENE 1030) | Blown Thickness (micron) | Drawn Thickness (micron) | M D Draw Ratio | Blow Ratio | DR/BR | Tear (gms/mil) | Tensile M D | Mega Pascals T D |
|---|---|---|---|---|---|---|---|---|---|
| 1 |  | 225 | 75 | 3:1 | 3:1 | 1:1 | 20 | 85 | 27 |
| 2 |  | 150 | 25 | 6:1 | 3:1 | 2:1 | 180 | 175 | 27 |
| 3 | +20% CIL 503 | 150 | 25 | 6:1 | 3:1 | 2:1 | 220 | 150 | 27 |
| 4 |  | 225 | 75 | 3:1 | 2:1 | 1.5:1 | 40 | 85 | 24 |
| 5 | +20% CIL 503 | 225 | 75 | 3:1 | 2:1 | 1.5:1 | 70 | 75 | 24 |
| 6 |  | 225 | 75 | 3:1 | 1:1 | 3:1 | 190 | 75 | 22 |
| 7 |  | 75 | 25 | 3:1 | 1:1 | 3:1 | 170 | 75 | 22 |
| 8 | +20% CIL 503 | 225 | 75 | 3:1 | 1:1 | 3:1 | 240 | 70 | 22 |

TABLE 2

| Draw Ratio | | Tear (gms/mil) | | Ultimate Tensile | |
|---|---|---|---|---|---|
| MD | TD | MD | TD | MD | TD |
| 2 | 2 | 90 | 120 | 66 | 48 |
| 3 | 3 | 50 | 60 | 80 | 75 |
| 4 | 4 | 20 | 20 | 95 | 97 |
| 5 | 5 | 10> | 10> | 102 | 100 |

These results showed the expected trend of rapid decrease in both MD and TD tear properties with corresponding increase in tensile strength. Tear properties of films with balanced stretch of 3:1 or greater are generally unacceptable for shipping sacks.

EXAMPLE III

A series of experiments similar to those described in Example 2 with the same resin were carried out but wherein the TD draw ratio was maintained constant at 2:1. The results are shown in TABLE 3.

TABLE 3

| Draw Ratio | | Tear (gms/mil) | | Ultimate Tensile | |
|---|---|---|---|---|---|
| MD | TD | MD | TD | MD | TD |
| 2 | 2 | 90 | 120 | 66 | 48 |
| 3 | 2 | 150 | 200 | 80 | 50 |
| 4 | 2 | 200 | 240 | 90 | 52 |

TABLE 3-continued

| Draw Ratio | | Tear (gms/mil) | | Ultimate Tensile | |
|---|---|---|---|---|---|
| MD | TD | MD | TD | MD | TD |
| 5 | 2 | 300 | 320 | 92 | 53 |
| 6 | 2 | 430 | 400 | 89 | 54 |

The results show that both the MD and TD tear improved uniformly with increased MD draw ratio, i.e. increases MD orientation.

I have, thus, found that by restricting the degree of TD draw in relationship to the MD draw the dramatic imbalance of tensile and tear properties associated with uniaxially orientation and associated tendency for film "splittiness" can be avoided. In addition, films drawn in this fashion while having MD and TD tensile improvement of 100%, have balanced and increasing tear properties with increasing orientation. For practical purposes TD draw ratios of 2:1 would be typical. TD draw ratio of greater than 3:1 would be impractical since undrawn film thickness would be double that required for the 2:1 drawn material making control of the cold-drawing operation much more difficult to achieve.

Figure 2:
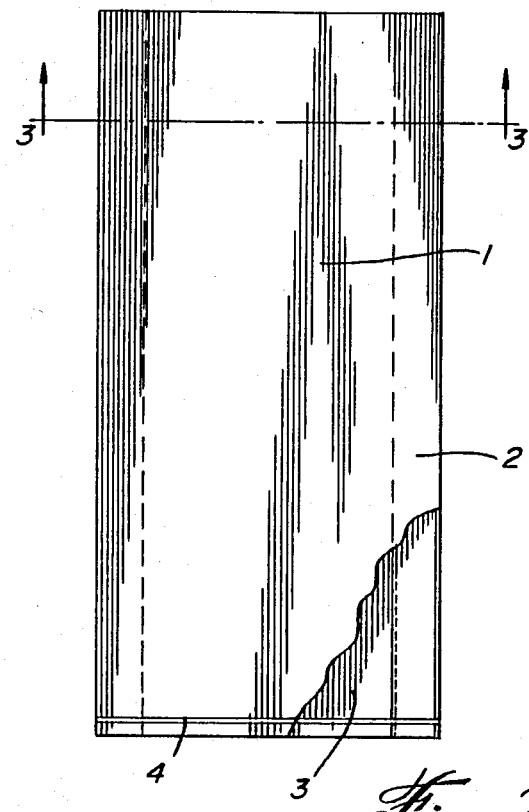
FIG. 2 shows a front elevational view, partly cut away, of an open-top tubular sack according to the invention.
Figure 3:
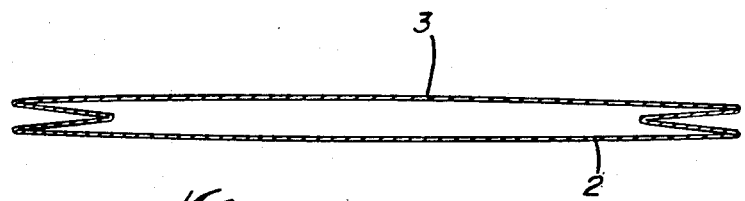
FIG. 3 is a sectional view along 3—3 of FIG. 2.

FIGS. 2 and 3 show a generally rectangular single ply tubular sack 1 having a front wall 2 and a back wall 3 formed of a cold-drawn polyethylene film made from the blend consisting of EXXON 1030 /CIL 633 as described in Example III according to the process of manufacture as hereinbefore described. The MD draw ratio of the film is 5 and the TD draw ratio is 2. One end 4 of the tubular sack is heat sealed to form a single ply open-top sack.

Figure 4:
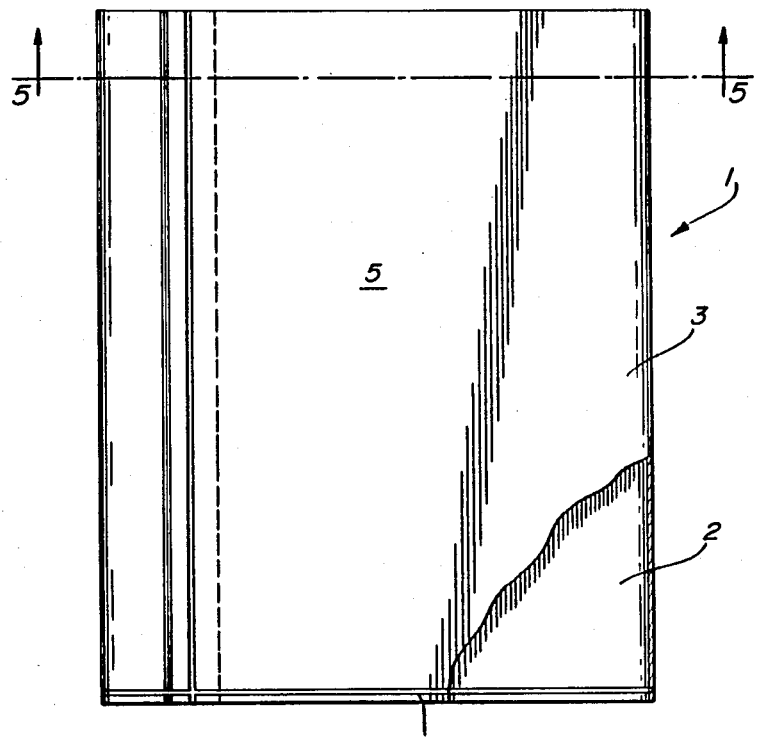
FIG. 4 is a front elevational view of an open-top heavy duty sack according to the invention.
Figure 5:
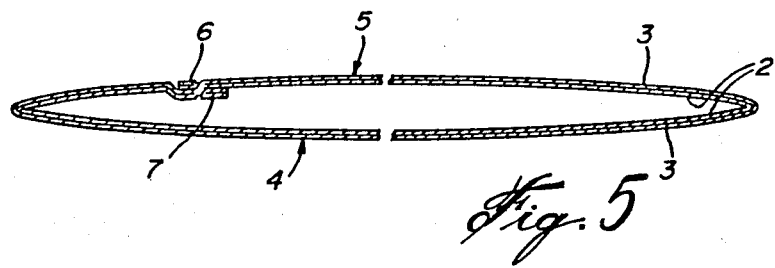
FIG. 5 is a sectional view along line 5—5 of FIG. 4.

FIGS. 4 and 5 show a generally rectangular 2-ply pillow-type sack 1 having an inner wall 2 formed of blown linear low density polyethylene film (3 mil) manufactured from "2045" linear low density polyethylene resin (Dow Chemical Co.), and an outer ply 3 (3.5 mil) of unbalanced biaxially oriented linear low density polyethylene film blend of EXXON 1030 /CIL 633 as hereinbefore described.

The sack 1 has, thus, a 2-ply back wall 4, and a 2-ply front wall 5 made up of first and second partially overlapping panels 6 and 7. The outer ply 3 of back wall 4 is continuous with the outer wall 3 of front wall 5 except where separated and joined together by heat sealing with layer 2 in the overlapping panels 6 and 7. Thus, the walls 4 and 5 are integral and form a 2-ply tube. One end of the tube 8 is heat sealed to form a simple 2-ply open-top bag.

The sack is made by feeding a web of 37" film 3 into a longitudinal folding frame with a web of film 2 and forming a 2-ply tube 18" wide with a 1" overlapping portion. The four plies of the overlapping area are then heat sealed longitudinally to consolidate the 2-ply tubing which is then passed to a transverse heat seal unit to make the bottom seal 8. A 26" length of tube with the heat seal present is cut from the web by a guillotine to form the open top bag 1.

The open top of the sack is generally heat sealed after filling with product to produce an airtight and water-tight package. Because it is extremely difficult to exclude all air from the filled package prior to the heat sealing operation, it is preferable to perforate the walls of the bags with pinholes typically 0.025" in diameter to facilitate air release, the number of holes required depending on the amount of air left in the bag and the type of product being packaged. In those cases where it is critical that the package retains its maximum value for airtightness and moisture protection, the perforation holes in the inner and outer plies are offset typically by 1½" to create an indirect path to air-product mixes during the venting period.

Although the inner ply 2 of the sack is described as a single ply of sheeting it can be readily appreciated that a 2-ply tube of 1.5 mil could also be used instead. Indeed, since tubing may be less expensive to manufacture the tube could be a preferred option.

Figure 6:
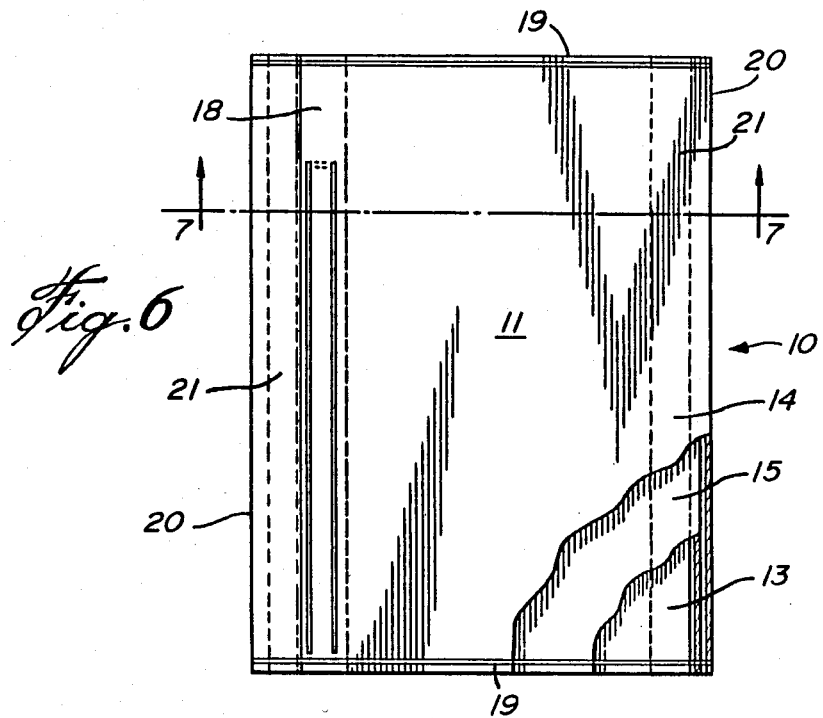
FIG. 6 is a front elevational view of a heavy duty valved bag according to the invention.
Figure 7:
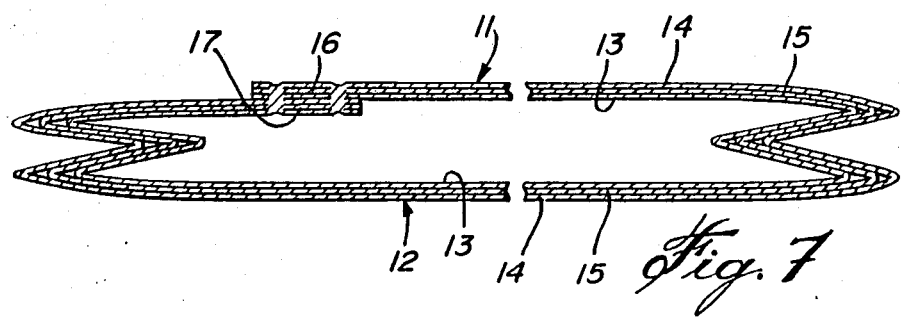
FIG. 7 is a sectional view along the line 7—7 of FIG. 6.

FIGS. 6 and 7 show a generally rectangular 3-ply pillow-type bag 10 having a front side 11 and a back side 12 joined together around the entire periphery of the bag. Front side 11 consists of an inner wall 13 and an outer wall 14 formed of blown linear low density polyethylene (4 mil), and a middle wall 15 of the same unbalanced biaxially oriented linear low density polyethylene film as for FIG. 4 (3.5 mil). Back side 12 is of an identical construction.

Front side 11 has partially overlapping panels 16 and 17 heat sealed together longitudinally to form a 3-ply tube open only to form a self-closing filling sleeve 18. The tube is heat sealed at both ends 19 to form a complete valved bag of the type illustrated in our U.S. Pat. No. 3,833,166. In the embodiment shown the bag has its lateral edges 20 tucked in and heat sealed in the longitudinal region 21 through twelve layers of film.

Figure 8:
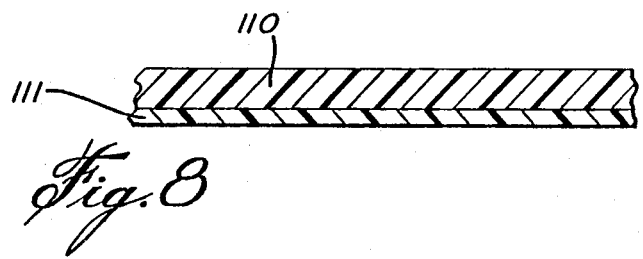
FIG. 8 is a cross-sectional view of a preferred laminate of a thermoplastic film according to the invention.

FIG. 8 shows a sheet 110 of unbalanced biaxially oriented linear low density polyethylene (as for FIG. 4) of 1.5 mil thickness and a sheet 111 of low density polyethylene of 0.25 mil thickness laminated thereto. The laminated sheets may be prepared by extrusion lamination.

It is preferred that the low density polyethylene in contact with the unbalanced biaxially oriented ply has as low a melting point as possible and be as fluid as possible when melted. These characteristics are generally achieved using low density polyethylene polymers with relatively low tensile yield strength. It is, therefore, desirable that the inner layer of the 2-ply structure be a co-extrusion with only a thin layer, typically 0.25 mil thick, of low melt temperature, high melt index film on the layer in direct contact with the unbalanced biaxially oriented film.

I have found that the thickness of the inner layers of low density polyethylene required to produce an acceptable heat seal will depend greatly on the elasticity of the unbalanced biaxially oriented film to be used, i.e., the less elastic the unbalanced biaxially oriented film the thicker the low density polyethylene film must be. Relative thicknesses of all the polyethylene layers can be readily determined by the skilled man.

I claim:

1. A thermoplastic shipping sack having walls comprising a cold-drawn unbalanced biaxially oriented linear low density polyethylene film having a transverse direction draw ratio selected from greater than 1 to less than 3 and a machine direction draw ratio of less than 6 but greater than the transverse direction draw ratio.

2. A sack as claimed in claim 1 wherein said polyethylene film has a cold-drawn transverse direction ratio of 2 and a machine direction ratio of 5.

3. A sack as claimed in claim 1 wherein said linear low density polyethylene contains a minor amount of low density polyethylene.

4. A sack as claimed in claim 1 wherein said linear low density polyethylene contains a minor amount of high density polyethylene.

5. A sack as claimed in claim 1 wherein said film of unbalanced biaxially oriented linear low density polyethylene forms part of a multi-layer laminate with one or more layers of one or more compatible ethylene polymers or copolymers.

6. A sack as claimed in claim 1 wherein said sack comprises a front wall and a back wall, each of said front wall and said back wall comprising a ply of said unbalanced biaxially oriented linear low density polyethylene and wherein interposed between said plies are two inner plies of low density polyethylene.

7. A sack as claimed in claim 1 wherein the sack is a multi-ply sack.

8. A cold-drawn unbalanced biaxially oriented linear low density polyethylene film having a transverse direction draw ratio selected from greater than 1 to less than 3 and a machine direction draw ratio of less than 6 but greater than the transverse direction draw ratio.

9. A film as claimed in claim 8 having a cold-drawn transverse direction ratio of 2 and a machine direction ratio of 5.

10. A film as claimed in claim 8 wherein said linear low density polyethylene contains a minor amount of a low density polyethylene selected from a low density polyethylene and a high density polyethylene.

11. A themoplastic laminate comprising a cold-drawn unbalanced biaxially oriented linear low density polyethylene film having a transverse direction draw ratio selected from greater than 1 to less than 3 and a machine direction draw ration of less than 6 but greater than the transverse direction draw ratio, and one or more layers of one or more compatible ethylene polymers or copolymers.

12. A laminate as claimed in claim 11 wherein said film has a cold-drawn transverse direction ratio of 2 and a machine direction ratio of 5.

13. A laminate as claimed in claim 11 wherein said linear low density polyethylene contains a minor amount of a low density polyethylene selected from a low density polyethylene and a high density polyethylene.

* * * * *